United States Patent
Bryce et al.

(10) Patent No.: US 7,983,615 B2
(45) Date of Patent: Jul. 19, 2011

(54) CONFIGURING AND CONNECTING TO A MEDIA WIRELESS NETWORK

(75) Inventors: Stuart Bryce, Crows Nest (AU); Richard D. Kinder, Eastwood (AU)

(73) Assignee: Altec Lansing Australia Pty Limited, Sydney (AU)

( * ) Notice: Subject to any disclaimer, the term of this patent is extended or adjusted under 35 U.S.C. 154(b) by 877 days.

(21) Appl. No.: 11/873,238

(22) Filed: Oct. 16, 2007

(65) Prior Publication Data

US 2008/0092204 A1 Apr. 17, 2008

Related U.S. Application Data

(60) Provisional application No. 60/829,732, filed on Oct. 17, 2006.

(51) Int. Cl.
*H04B 7/00* (2006.01)
*H04H 40/00* (2008.01)

(52) U.S. Cl. .............. 455/41.2; 455/41.3; 455/3.06

(58) Field of Classification Search ........... 455/41.2, 455/41.3, 411, 433, 557, 3.06, 414.1, 414.3, 455/414.4, 230, 507
See application file for complete search history.

(56) References Cited

U.S. PATENT DOCUMENTS

| | | | |
|---|---|---|---|
| 6,466,832 B1 | 10/2002 | Zuqert et al. | |
| 6,954,641 B2 | 10/2005 | McKenna et al. | |
| 2002/0133764 A1 | 9/2002 | Wang | |
| 2004/0160928 A1 | 8/2004 | Perlman | |
| 2005/0141469 A1 | 6/2005 | Miller et al. | |
| 2005/0169193 A1 | 8/2005 | Black et al. | |
| 2005/0288805 A1 | 12/2005 | Moore et al. | |
| 2006/0173978 A1* | 8/2006 | Palm et al. ............ | 709/220 |
| 2006/0174116 A1 | 8/2006 | Balfanz et al. | |
| 2007/0192833 A1 | 8/2007 | Ho et al. | |

FOREIGN PATENT DOCUMENTS

| | | |
|---|---|---|
| EP | 1380918 | 1/2004 |
| GB | 2402302 | 8/2005 |

* cited by examiner

*Primary Examiner* — Eugene Yun
(74) *Attorney, Agent, or Firm* — Tarolli, Sundheim, Covell & Tummino LLP

(57) ABSTRACT

A method performed by a wireless media device such as a wireless loudspeaker subsystem for configuring and connecting to a media wireless network. The wireless media device first associates to an existing infrastructure based wireless network at a first phase. At a second phase, the wireless media device establishes a secure communications tunnel with a complementary wireless device that has also previously associated to the existing wireless network. Using the secure tunnel, the wireless media device shares with the complementary wireless device data indicative of a set of parameters for a second wireless media wireless network at a third phase. Once this sharing is complete, the wireless media device connects to the second wireless network at a fourth phase.

27 Claims, 15 Drawing Sheets

| Type | Length | Value |
|---|---|---|
| Vendor specific | 1 | 0xDD |
| Length | 1 | 36 |
| OUI | 3 | 0x00180E |
| Type | 1 | 0x00 |
| Crypted data | 32 | The encrypted data as passed by the master device during initial (secure tunnel) authentication. |
| MIC | 4 | MIC over the contents of the reassociation frame, with this MIC field zeroed out. The MIC key used and type of MIC used is dependent upon the particular implementation. |

FIG. 9

CONFIGURING AND CONNECTING TO A MEDIA WIRELESS NETWORK

RELATED PATENT APPLICATIONS

The present invention claims priority of U.S. Provisional Patent Application No. 60/829,732 filed 17 Oct. 2006 to inventors Bryce et al. The contents of U.S. Provisional Patent Application No. 60/829,732 are incorporated herein be reference.

This invention is also related to the following U.S. patent applications:

Concurrently filed U.S. patent application Ser. No. 11/872,931 titled UNIFICATION OF MULTIMEDIA DEVICES, to inventors Bryce et al.

Concurrently filed U.S. patent application Ser. No. 11/873,119 titled MEDIA DISTRIBUTION IN A WIRELESS NETWORK, to inventor Kinder et. al.

U.S. patent application Ser. No. 11/559,360 filed Nov. 13, 2006 to inventors Celinski et al., titled MEDIA DATA SYNCHRONIZATION IN A NETWORK ENVIRONMENT, to inventors Celinski et al. This Application is referred to herein as the "Synchronization Invention."

The contents of each such related patent application are incorporated herein by reference.

FIELD OF THE INVENTION

The present invention relates generally to wireless network configuration for media playback.

BACKGROUND

"Synchronized media data playback" in the present context refers to a scenario wherein media source data that includes time sensitive data is to be played back to a human subject at more than one playback device such that synchronization is to be achieved. Such playback may further need to be real-time playback such that the playback is within a predetermined time period of that data being provided at the source. Consider for example a multimedia file having separate audio and video components, and further a plurality of audio components. These components should be played back in a manner that minimizes delay between what the human subject sees and hears, and furthermore that the various audio components are synchronized. Such a relative delay is often referred to as a "lip-sync delay", and typically a lip-sync delay of at most ±20 milliseconds is regarded as acceptable.

Wireless networks are becoming widespread. Achieving synchronized playback and/or real-time playback of media data transmitted over typical, e.g., standards based wireless packet networks is difficult. Such networks are typically subject to some degree of latency, resulting from the likes of network delays, re-transmissions, jitter and lost packets. Particularly, in the case of wireless media playback, if the data transmission is to be performed using a standard IEEE 802.11 wireless home network using off the shelf network components, then Quality of Service (QoS) between wireless media devices cannot be guaranteed. Furthermore, in such a network, wireless media devices often compete with other devices—such as networked computers for network resources.

Various techniques are known for selecting network parameters that allow network resource management appropriate to time-sensitive data, e.g., media data playback. These techniques, however, are not easily incorporated into a simple plug-and-play consumer-oriented media system. Furthermore, the home network might include a third-party, e.g., user supplied and configured access point. Selecting network parameters that allow network resource management appropriate to media playback is even more difficult when the wireless media system uses such a third part access point. Networked devices, for example, cannot generally easily modify the behavior of existing access points. Hence the latency observed across the network cannot be easily controlled by the devices in the network.

There thus is a need for a method performed by a wireless media device for configuring and connecting to a media wireless network.

SUMMARY

One embodiment of the invention includes a method performed by a wireless media device for configuring and connecting to a media wireless network, the method including: connecting to a first wireless network; establishing a secure communications tunnel with a complementary wireless device on the first wireless network; sharing with the complementary wireless device over the secure communications tunnel data indicative of a set of parameters for a media wireless network; and connecting to the media wireless network.

In one embodiment, in response to completion of the sharing, the device disconnects from the first wireless network. In one embodiment, disconnecting from the first wireless network includes de-authenticating from the first wireless network.

In one embodiment, the set of parameters are selected to tune the media wireless network for a particular purpose. In one embodiment, the purpose is media data transport or wireless media steaming so that playback amongst different playback devices is synchronized.

In one embodiment, the step of establishing the secure identification tunnel uses a key exchange protocol, e.g., a Diffie Hellman key exchange protocol. Also in one embodiment, the step of establishing the secure identification tunnel allows mutual authentication of the wireless media device and complementary wireless device. Also in one embodiment, the wireless media device and complementary wireless device maintain respective digital certificates for use in the mutual authentication.

In one embodiment, establishment of the secure identification tunnel provides a virtual network for interfacing the wireless media device with the complementary wireless device such that a packet sent at one side of the tunnel is securely delivered at the other end of the tunnel.

In one embodiment, the method includes a master/slave determination step for the wireless media device to determine whether it is a relative slave device or relative master device by comparison to the complementary wireless device. In one embodiment, for the step of sharing data indicative of the set of parameters, the relative master device communicates to the relative slave device one or more configuration data packets indicative of the set of parameters. Furthermore, in one embodiment the wireless media device and complementary wireless device have respective hierarchical identifiers for facilitating the master/slave determination step. Furthermore in one embodiment, the hierarchical identifiers are embedded in respective unique device identifiers. In one embodiment, the unique device identifiers are MAC addresses.

In one embodiment, upon connection to the first wireless network the wireless media device undergoes a discovery procedure for allowing the wireless media device and the complementary wireless device to discover each other.

In one embodiment, the first wireless network is provided by a third party access point. In some embodiments, however, the first wireless network is provided by the wireless media device or by the complementary wireless device.

In one embodiment, the step of connecting to a first wireless network includes: searching for an available first wireless network; in the case that an available first wireless network is found, associating to that network; and in the case that an available first wireless network is not found creating an access point for providing the first wireless network and associating to that network.

In one embodiment, the wireless media device searches for an available wireless network for a predetermined period of time. Furthermore in one embodiment, the predetermined period is based on a component of a unique identifier of the wireless media device. In one embodiment, the unique identifier is the MAC address of the device.

In one embodiment, the complementary wireless device is enabled to perform substantially the same method as the wireless media device.

One embodiment of the invention includes a wireless media device including: a first wireless network interface for connecting to a first wireless network; a second wireless network interface for establishing a secure communications tunnel with a complementary wireless device on the first wireless network; a third wireless network interface for sharing with the complementary wireless device over the secure communications tunnel data indicative of a set of parameters for a second wireless network; and a fourth wireless network interface for connecting to the second wireless network.

One embodiment of the invention includes a computer-readable medium containing computer-executable code to enable a wireless media device for: connecting to a first wireless network; establishing a secure communications tunnel with a complementary wireless device on the first wireless network; sharing with the complementary wireless device over the secure communications tunnel data indicative of a set of parameters for a second wireless network; and connecting to the second wireless network.

One embodiment of the invention includes a method for establishing a securely configurable network for a plurality of wireless media devices. The method includes: allowing the wireless media devices to connect to a first wireless network; establishing one or more secure communication tunnels between the devices; passing over the one or more tunnels data indicative of a set of parameters for a second wireless network; and allowing the devices to connect to the second wireless network.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

BRIEF DESCRIPTION OF THE DRAWINGS

Benefits and advantages of the present invention will become apparent to those skilled in the art to which this invention relates from the subsequent description of example embodiments and the appended claims, taken in conjunction with the accompanying drawings, in which:

FIG. 9 shows an example information element used in an embodiment of the invention;

DESCRIPTION OF EXAMPLE EMBODIMENTS

Figure 1:
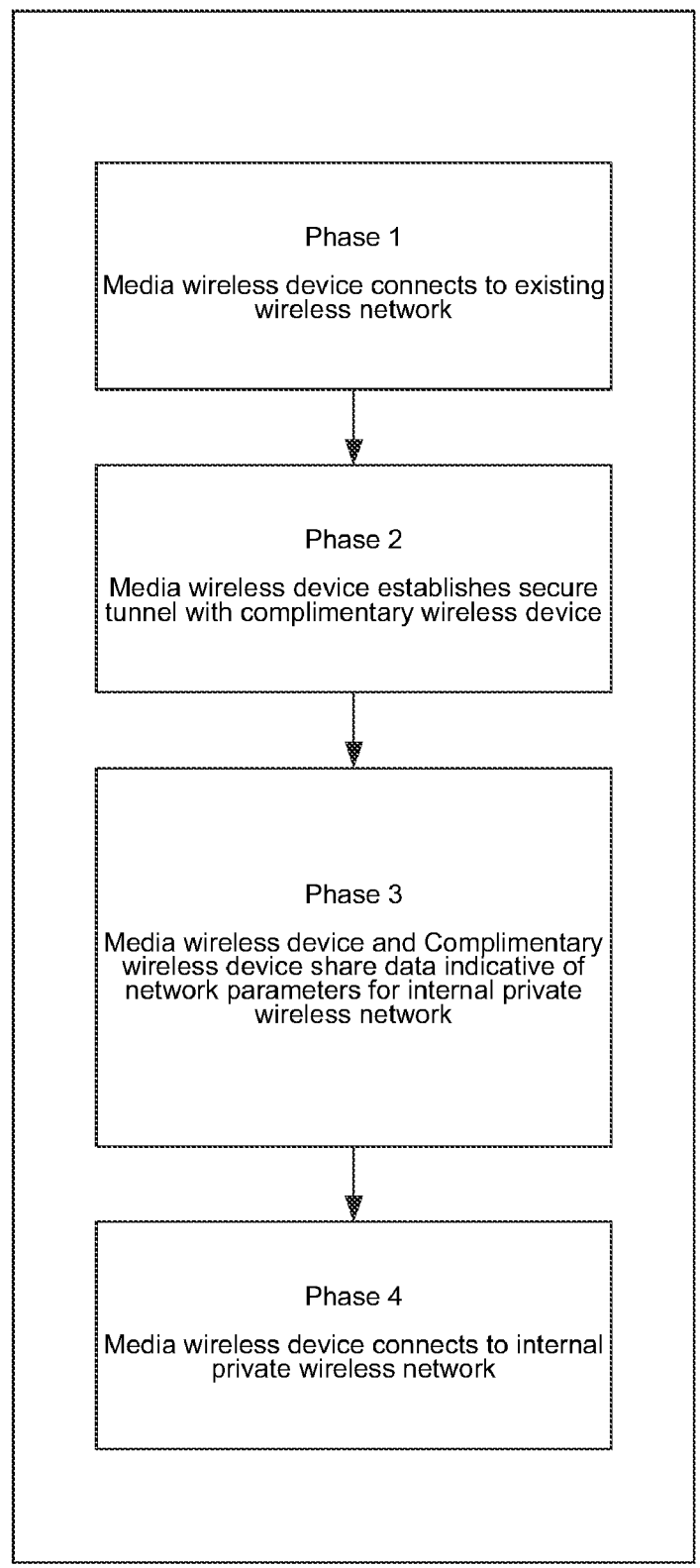
FIG. 1 is a schematic representation of a method performed by a wireless media device for establishing a media wireless network according to an embodiment of the invention.

FIG. 1 schematically illustrates one embodiment of a method performed by a wireless media device for configuring and connecting to a media wireless network. Such a wireless media device including provision for audio, e.g., audio playback. In one embodiment, the wireless media device either is already associated, or first associates to a first, e.g., an existing infrastructure based wireless network at phase 1. At phase 2, the wireless media device establishes a secure communications tunnel with a complementary wireless device that has also previously associated to the existing wireless network. Using the secure tunnel, the wireless media device shares with the complementary wireless device data indicative of a set of parameters for a second wireless media wireless network at phase 3. Once this sharing is complete, the wireless media device connects to the second wireless network at phase 4.

The second wireless network is typically an internal private wireless network. Often this network does not yet exist at the time phase 3, e.g., is not yet active, and the parameters of stage 3 are in effect indicative of a proposed internal private wireless network. In such cases the internal private wireless network comes into being at phase 4.

The term "media" should be read broadly to include audio, and in some embodiments either video or still images or both. Furthermore, the term "wireless media device" should be read broadly to include devices involved in the storage, organization, distribution, playback, and/or playback control of media data. Wireless media devices include wireless loudspeaker subsystems, wireless video devices, laptop computers carrying wireless media streaming or control applications, media servers, media players, control points, and so on. A "media wireless network" is a wireless packet-based network where data including media data is transferred by or to one or more wireless media devices.

The term wireless should be read broadly to cover communication conforming in a wireless packet network, such as a wireless local area networking (WLAN), e.g., a WLAN that conforms to the IEEE802.11 standard, as well as also other wireless communications techniques such as Bluetooth, Infra Red, optical communications, and so on.

The terms "tunnel" and tunneling" should be construed in their conventional senses in the field of digital communications. Generally speaking tunneling is a technology that enables one network to send its data via another network's connections, and is also known as encapsulation. "Tunneling" in the context of this disclosure should be read to include mechanisms such as encrypting data, using a shared or mutually generated key, and passing this data between two devices.

The term "complementary wireless device" should be construed to mean a device that is able to interact with the wireless media device for the purpose of secure wireless network configuration. In some instances the complementary wireless device is similar or even substantially identical to the wireless media device, and is enabled to perform a similar four-phase configuration method to form a secure link. In other instances the complementary wireless device is merely responsive to commands from the wireless media device for behaving in a manner corresponding to the four-phase method. In either situation, the net result is that both the wireless media device and complementary wireless device are connected to the same second wireless network at the time of completion of phase 4 by the wireless media device, or soon afterwards. In some cases, as discussed below, there are further requirements that must be met before a wireless device is proved to be complementary, such as the presence of an appropriate digital certificate.

In one embodiment of the method illustrated by FIG. 1, there are two distinct wireless networks included: a first existing wireless network and the second media wireless network. In the embodiment described herein, the first wireless network is an infrastructure wireless network conforming to the IEEE 802.11 standard provided by an access point, that is, a basic service set (BSS) in 802.11 terminology, identified by a service set identifier (SSID). Typically, such an access point is user supplied and configured, e.g., made by some third party. Such a first wireless network is readily discoverable by a wireless device. However network parameters in such a network are not easily controlled. Alternate embodiments are operable with first wireless network being other than an IEEE 802.11 BSS, e.g., with the first wireless network being an ad-hoc network.

The second wireless network is typically an internal private wireless network in which network parameters are more readily controlled. In the embodiment described herein, the second wireless network is an 802.11 wireless network. However other wireless networks such as Ultra Wideband (UWB) networks are used in some instances. In one example where UWB is used for the second wireless network, the wireless media device includes a standard 802.11 wireless network interface such that the existing first wireless network remains a part of the topology of the second UWB network. In a further embodiment two or more radios are used to stream the real-time data, and the data to be streamed is optionally interleaved to increase probability of successful transmission.

For the purpose of this disclosure, the terms "second wireless network," "internal private wireless network," "media wireless network," and variations on this common theme, are used interchangeably.

The second wireless network is in some embodiments physically separate from the existing wireless network. For example, in some embodiments, the second wireless network uses a separate channel to the existing wireless network. In other embodiments, the second wireless network is virtually separate from the existing wireless network, for example, sharing the same channel as the existing wireless network, and maintaining the existing connection to the existing wireless network One aspect of the inventive method includes using a physically or virtually separate second wireless network for the purpose of time-sensitive data streaming. In some embodiments, the secure establishment of this internal second wireless network for time-sensitive data allows pre-authentication of clients, e.g., for fast set-up, and selective control and exclusion of other devices.

In overview, enabling a wireless media device to perform a method as described in FIG. 1 results in that device, alone or in combination with a complementary wireless device, being able to substantially self-configure and self-establish a media wireless network. In practice, several so enabled complementary wireless media devices are initialized, and with little or no user assistance arrange themselves into an internal private wireless network for media purposes.

Figure 2:
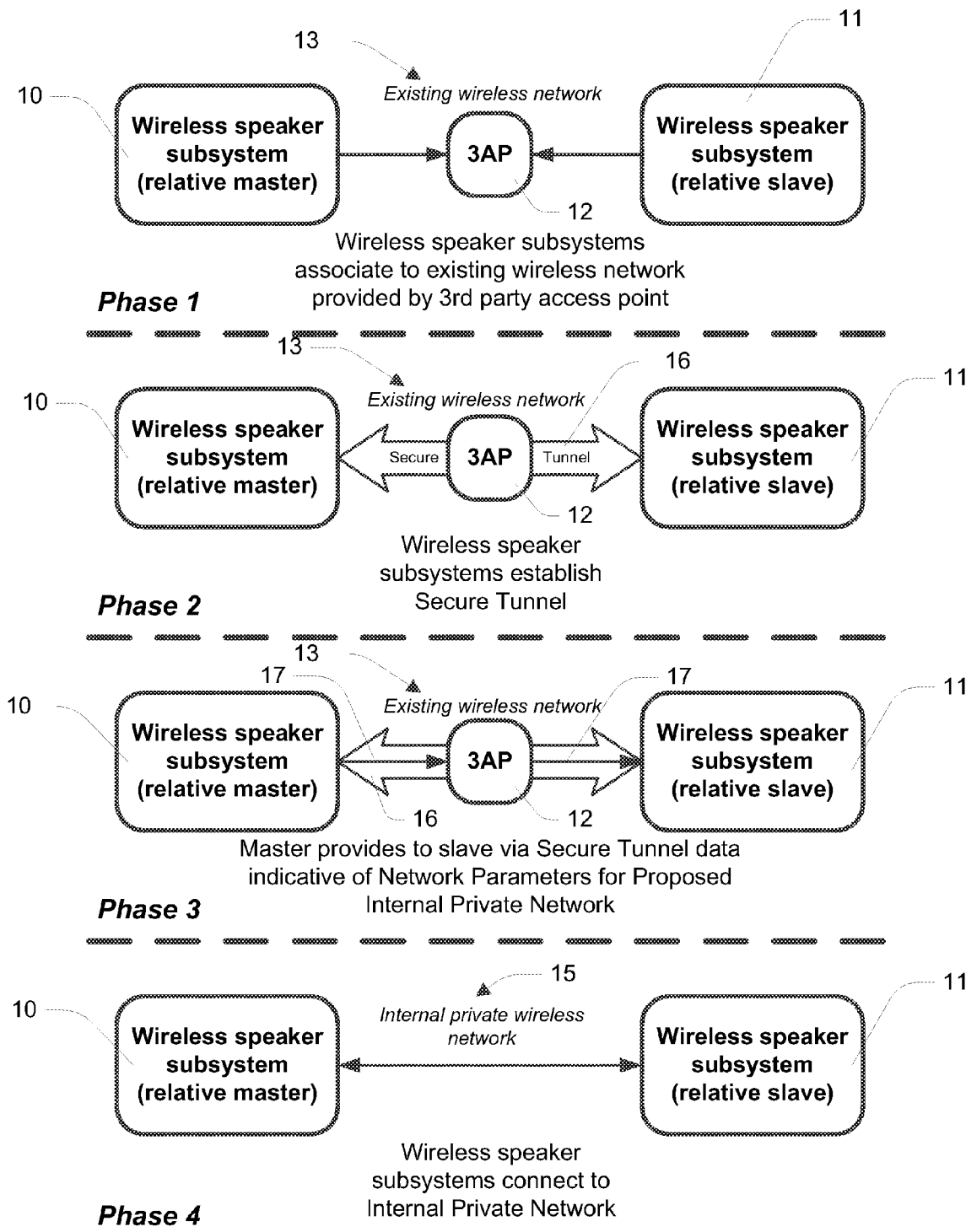
FIG. 2 is a schematic representation of a media system, method, and devices according to embodiments of the invention.

FIG. 2 illustrates an example hardware implementation of the above four-phase method. In this example, the wireless media device takes the form of a first wireless loudspeaker subsystem 10 and the complementary wireless device takes the form of a second wireless loudspeaker subsystem 11. In this instance the existing wireless network is provided by a third party access point 12, for example, the access point marked 3AP in FIG. 2, and generally designated by reference numeral 12. Wireless loudspeaker subsystems 10 and 11 in a broad sense perform the same four-phase method. That is, although specific details of the method vary between the devices, the general four-phase methodology is followed. It follows that, after completion of phase 4 by both devices, these devices are connected to a common wireless network having network parameters set out during phase 3. This wireless network is generally designated by reference numeral 15.

A "wireless loudspeaker subsystem" as disclosed herein includes not only the means for providing the output audio transduction functionality associated with a loudspeaker system per se, but also a wireless transceiver and the associated processing and communications functionalities included in an integrated wireless audio output device. Typically a wireless loudspeaker subsystem is a wireless node that includes a wireless network interface that has a wireless transceiver, and also apparatus including a digital-to-analog converter (DAC) to convert the bits from received packet payload that form a bitstream into an analog audio signal, and an audio amplifier to amplify the signal for output to a wireless loudspeaker subsystem. One embodiment includes a programmable processor in operative communication with an audio output assembly and a wireless networking interface component.

As shown in FIG. 2, devices 10 and 11 first associate to wireless network 13, then establish a secure communication tunnel 16. This tunnel 16 is used to share a set of network parameters 17. The term "sharing" as used within this disclosure, particularly as it relates to phase 3, should not be read to imply any need for two-way communication. For the purposes of this disclosure, a device should be construed to "share" data in any of the following circumstances: where the device sends data to a remote device; where the device receives data from a remote device; and where the device both sends data to a remote device and receives data from that remote device. Typically the sharing in phase 3 is predominately a one-way transfer of data, with one of wireless loudspeaker subsystems 10 and 11 assuming the role of a master for transferring data, the other assuming the role of a slave, as discussed in greater detail further below.

The set of parameters 17 partially or fully define the operation of wireless network 15. The set of parameters might include specified QoS parameters, power save mode options, beacon period, channel selection, SSID, and so on. The set of parameters and their values are typically chosen to tune wireless network 15 for a specific purpose. In the present example, the purpose is synchronized, and possibly real-time playback of audio over wireless network 15. In other embodiments, alternate sets of parameters for alternate purposes are selected such as prioritization of a particular type of data transfer over another.

Once the set of parameters 17 has been shared—that is, once wireless loudspeaker subsystems 10 and 11 each maintain data indicative of a like set of parameters 17, each of wireless loudspeaker subsystems 10 and 11 de-authenticates from wireless network 13. Following this de-authentication, the wireless loudspeaker subsystems connect to wireless network 15. As a result, wireless loudspeaker subsystems 10 and 11 are able to communicate over a wireless network having characteristics tuned particularly for the purpose of this communication: wireless audio playback.

An advantage of using an existing wireless network provided by an existing access point, such as is the case in the above example, relates to ease of configuration. When one of wireless loudspeaker subsystems 10 or 11 is initialized, it scans for an existing wireless network to which it can associate. It will be understood that it is a relatively straightforward process for an end user to configure a third party access point to allow association of local wireless devices such as wireless loudspeaker subsystems. Moreover, the process of configuring the access point is likely to have been earlier carried out for purposes other than wireless media, such as for the sharing of file data between personal computers located in a common place of residence or work, or for such computers to all connect to a single broadband Internet connection.

Once wireless loudspeaker subsystems 10 and 11 associate to wireless network 13, they undergo a discovery process. The particular nature of this discovery process varies between embodiments, and for the sake of the present example, a Universal Plug and Play (UPnP) style discovery process is used. In such a process, upon connecting to a network, a device firstly advertises its availability and services to other devices on the network, and then optionally conducts a search for the availability and services of other devices on the network. It will be appreciated that this provides only a broad overview of discovery, yet highlights an important aspect: all devices that implement a like or complementary discovery protocol discover one another. In other embodiments other discovery procedures are used, such as those provided by other connectivity protocols including Bonjour and Jini, as well as purpose designed proprietary discovery protocols. Bonjour is a general method to discover services on a local area network, and was formerly called Rendezvous. It is Apple's trade name for its implementation of the Zeroconf specification framework. For Jini, see www.jini.org.

In the present embodiment, the wireless loudspeaker subsystems inherently adopt a relative master or slave role. In the context of FIG. 2, it is assumed that wireless loudspeaker subsystem 10 is the master and wireless loudspeaker subsystem 11 is the slave. It will be appreciated that there are a number of techniques for managing the assignment of a master and a slave between a pair of devices. In a simple instance, the devices are physically different so as to inherently define a master and a slave. For example, in a system having a first wireless loudspeaker subsystem having an input for receiving a S/PDIF signal and a second wireless loudspeaker subsystem that does not accept a S/PDIF signal, the first wireless loudspeaker subsystem is inherently designed to act as a master. In situations where there is no clear master and slave based on hardware configurations, alternate approaches are implemented. In the present example, use is made of device MAC addresses. The MAC address for each wireless media device is embedded with a hierarchical identifier, such as the numerical value of the final byte in the address. The devices inherently self assign master and slave roles based on a comparison of these identifiers. In such an instance the devices are "relative" master and slave. That is, in one implementation a particular device might be master, whilst in another implementation, that same device might be slave.

The use of MAC addresses for master/slave assignment should not be regarded as limiting. In other embodiments alternate approaches are adopted. Such alternate approaches include, for example:

The use of a unique hierarchy identifier as part of a discovery message. That is, a device advertises itself in a manner indicative of a hierarchy identifier, and another device recognizes that device as a relative master or slave based on a comparison of the discovered device's hierarchy identifier and its own hierarchy identifier.

A unique device hierarchy identifier. This is similar to the MAC address approach, but uses another number that may or may not be pre-existing for other networking purposes.

A connection time based protocol where the first device to associate to the first wireless network is the master.

Random selection.

An assessment of network conditions, such as selecting the device with the best signal level to the majority of the devices in the network.

At phase 3, the master wireless loudspeaker subsystem (wireless loudspeaker subsystem 10) provides to the slave wireless loudspeaker subsystem (wireless loudspeaker subsystem 11) data indicative of the set of parameters 17. The wireless loudspeaker subsystems subsequently connect to wireless network 15.

Figure 3:
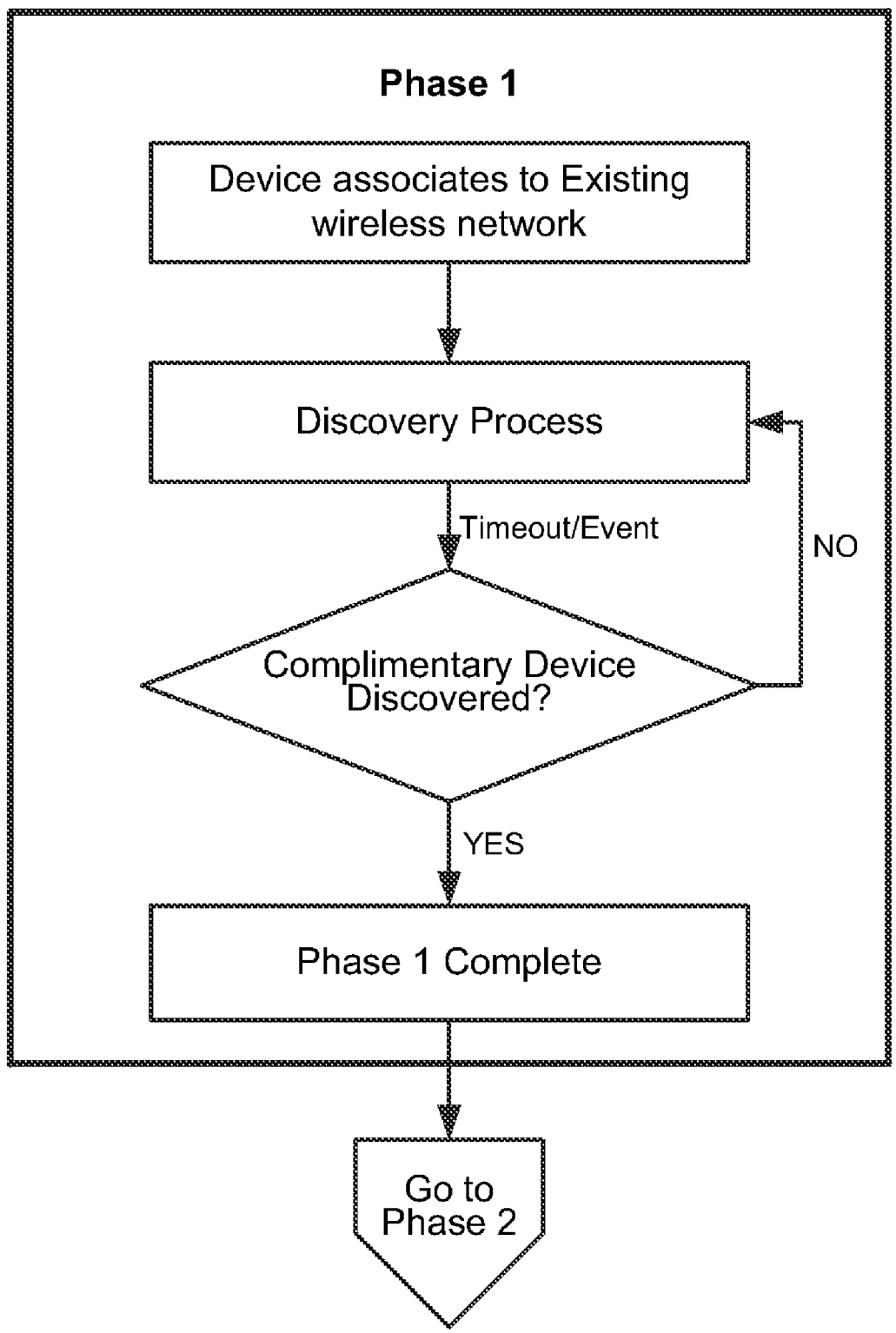
FIG. 3 shows an element of the method of FIG. 1 in greater detail.

FIG. 3 shows a flowchart of an example method for implementing phase 1. First a device associates to an existing wireless network. Following this, a discovery process is carried out. If a complementary wireless device is discovered the method continues to phase 2. Otherwise the discovery process continues. In the case of UPnP discovery, the discovery process would continue until a complementary UPnP device connects to the network and advertises its availability and services.

Figure 4:
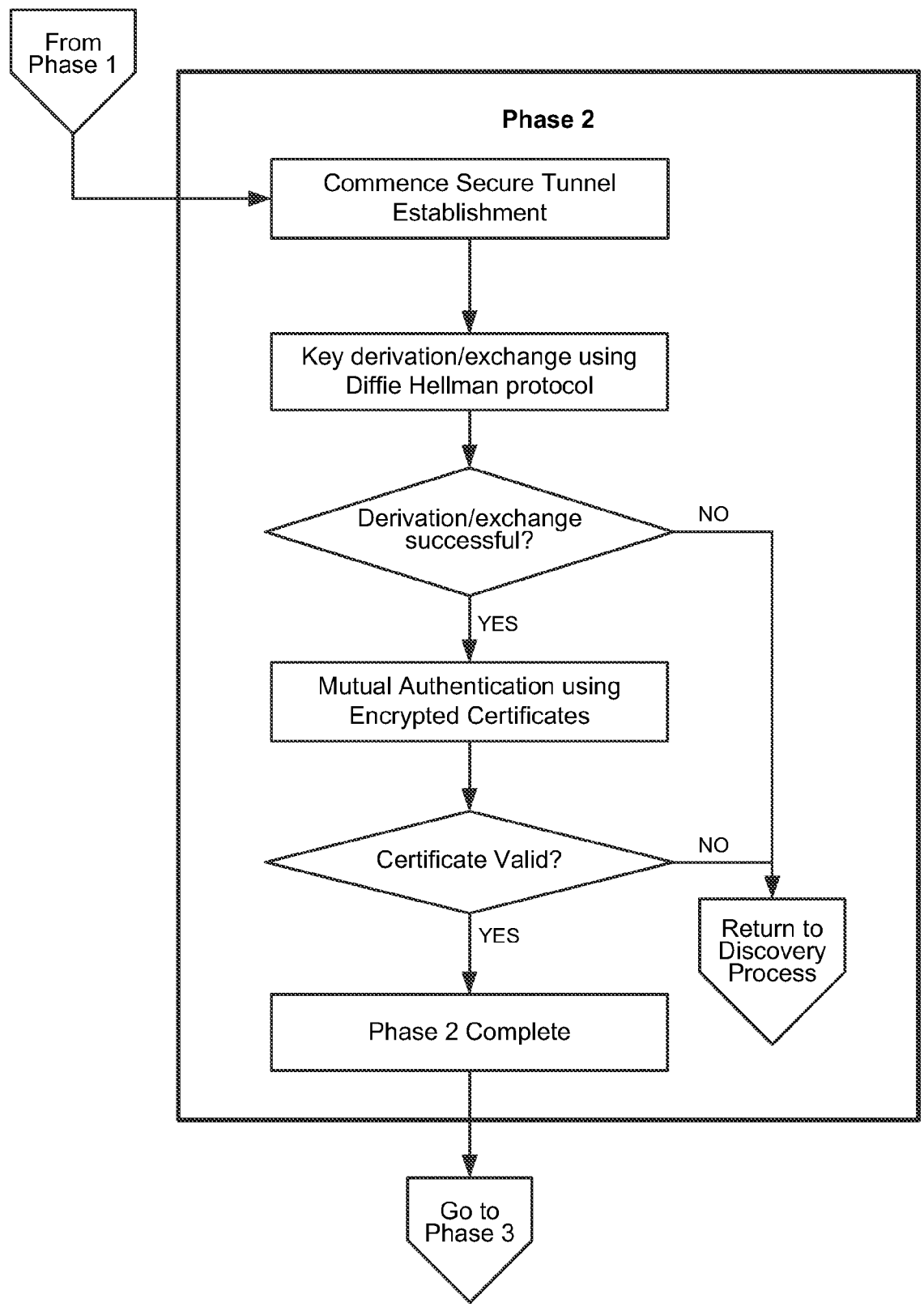
FIG. 4 shows another element of the method of FIG. 1 in greater detail.

FIG. 4 illustrates an example implementation of phase 2 in greater detail. This should not be regarded as limiting, and various other techniques for secure tunnel establishment are used in other embodiments.

In the example of FIG. 4, each wireless device maintains an electronic certificate which is used for mutual device authentication. One example of a certificate is a vendor-specific X.509 certificate. In one embodiment, proprietary certificates are used. This provides for restricting authentication to devices determined by a party issuing the certificates, e.g., the manufacturer or supplier, to be "complementary." Thus, one embodiment uses a vendor specific certificate and a policy that prevents interaction between devices of a different vendors that are decided to be incompatible or undesirable. In other examples, the certificates are made available only to manufacturers of devices that agree to meet particular technical and quality standards. In yet another example, a hierarchy of certificate authorities from a common ancestor is used to allow inter-manufactured devices to mutually authenticate using the common ancestor. In the example of wireless audio, this is, in one embodiment, used to prevent low quality wireless loudspeaker subsystems from being used in what is meant to be a high quality sound system.

In the example of FIG. 4, a Diffie-Hellman key exchange protocol is used to carry out a key exchange between the devices such that both devices share a common or compatible encryption key. A Diffie-Hellman key exchange allows two entities that might have no prior knowledge of each other to jointly establish a shared secret key over an insecure communications channel. See, for example, Martin E. Hellman, "An overview of public key cryptography," IEEE Communications Magazine, May 2002, pp: 42-49, for a description of the Diffie Hellman key exchange protocol. More specifically, in the present embodiment the secure session is set up using the Diffie Hellman key exchange protocol, with a proprietary protocol used to generate domain parameters denoted (p, g) to be used in the key exchange. (p, g) form a multiplicative group of integers modulo p, where p is prime and g is primitive mod p. These parameters p and g are not broadcast over the unsecured network. If the key derivation/exchange is successful, the devices seek to mutually authenticate by virtue of their respective certificates, which are in this instance encrypted using the keys identified by the Diffie Hellman procedure. Upon successful mutual authentication the devices progress to phase 3.

An advantage of the Diffie Hellman based approach used in one embodiment is that certificate data is able to be encrypted prior to transfer for the purposes of authentication. This reduces the risks associated with making certificate data readily accessible to third parties.

In another embodiment, a Transport Layer Security (TLS) handshake protocol is used as an alternative to Diffie Hellman key exchange. In such an embodiment, phase 2 includes a master to slave certificate validation process and, if certificate validation is successful, the secure tunnel establishment phase completes with an encryption key derivation and exchange process. Again, both devices share a common or compatible encryption key.

Those in the art will understand that many key exchange protocols are known, and that alternate embodiments can use such key exchange protocols. See for example, the IEEE 802.11i standard and the WiFi WPA2 standard that describes several 4-way key exchange protocols.

With the secure tunnel established, devices on both ends of the tunnel have a virtual network interface to which data packets can be sent by applications, and subsequently delivered securely to the other end of the tunnel. In situations where certificate validation is not successful, each device returns to the discovery stage of phase 1.

Phase 3 generally includes configuration of devices to participate in the second wireless network, and is commenced once the secure tunnel is established. In the present instance, authentication to the master device during phase 3 is performed by both devices by exchanging and verifying digital certificates signed by a common Certificate Authority (CA), for example, in one embodiment, the manufacturer of the devices might operate such a Certificate Authority.

Following authentication, the master performs configuration of the slave device by passing network parameters. The precise nature of these parameters varies between embodiments depending on whether the second wireless network is to be physically or virtually separate. The parameters typically include an service set identifier (SSID), operating channel, encryption keys that are to be used, usually along with other parameters affecting network performance and allow purpose specific network tuning. Often the parameters include a time for the commencement of phases 3 and or 4—that is a time at which the devices will cut over to the new second wireless network. For example, a time is defined in terms of a relative offset to the current time synchronization function (TSF) timestamp of the infrastructure network (the BSS) to which the devices are currently authenticated.

It will be recognized that there are a variety of techniques for configuring access point and wireless station parameters. An example is provided below for the sake of explanation only, and should not be regarded at limiting. In one version of the example, there is no pre-authentication, that is, pre-authentication is a null operator, assuming that mutual authentication of the devices occurred during phase 2.

Figure 5:
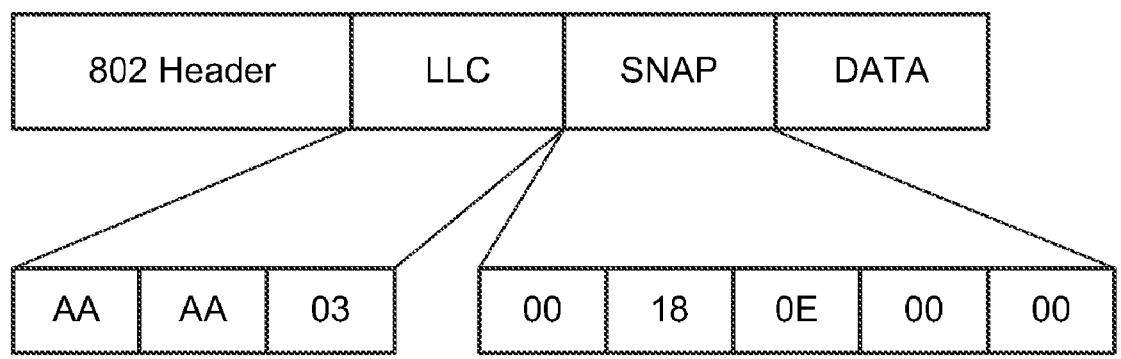
FIG. 5 shown an example frame used in an embodiment of the invention.

In this example, configuration is performed using an IEEE 802.3 SNAP Frame Format packet whose structure is shown in FIG. 5. Following a data link (802) header is the Logical Link Control Header (LLC), and then the Sub-Network Access Protocol (SNAP) header that contains 24 bits of an IEEE-assigned Organizationally Unique Identifier (OUI), and 16 bits containing a Protocol Identifier (PID). In FIG. 5, the LLC, OUI and PID shown are purely for illustrative purposes, and in an actual embodiment, would be substituted for the approved OUI/PID combination. It is also noted that the format of the packet of FIG. 5 may be replaced by many other different formats, such as an Ethernet v2 encapsulated frame, using a custom Ethertype field. Likewise, the data link 802 header is able to be substituted for an alternate header, or in some cases altogether omitted. It will be recognized that the example frame excludes a tunnel specific header that must be present for the packet to reliably and securely transferred via the secure tunnel.

Continuing with FIG. 5, in one embodiment, the DATA field contains an identifier indicative of whether the packet is a configuration packet or a control packet. Configuration packets are used to convey configuration information such as the parameters for the second wireless network—such as SSID, channel number, and so on. Control packets are used to cause or acknowledge some event—such as the completion of configuration.

In this particular example, it is assumed that the tunnel between the two devices is secure and reliable, that is, that there will be no dropped packets. Recovery from dropped network links is a function of a higher layer.

Figure 6:
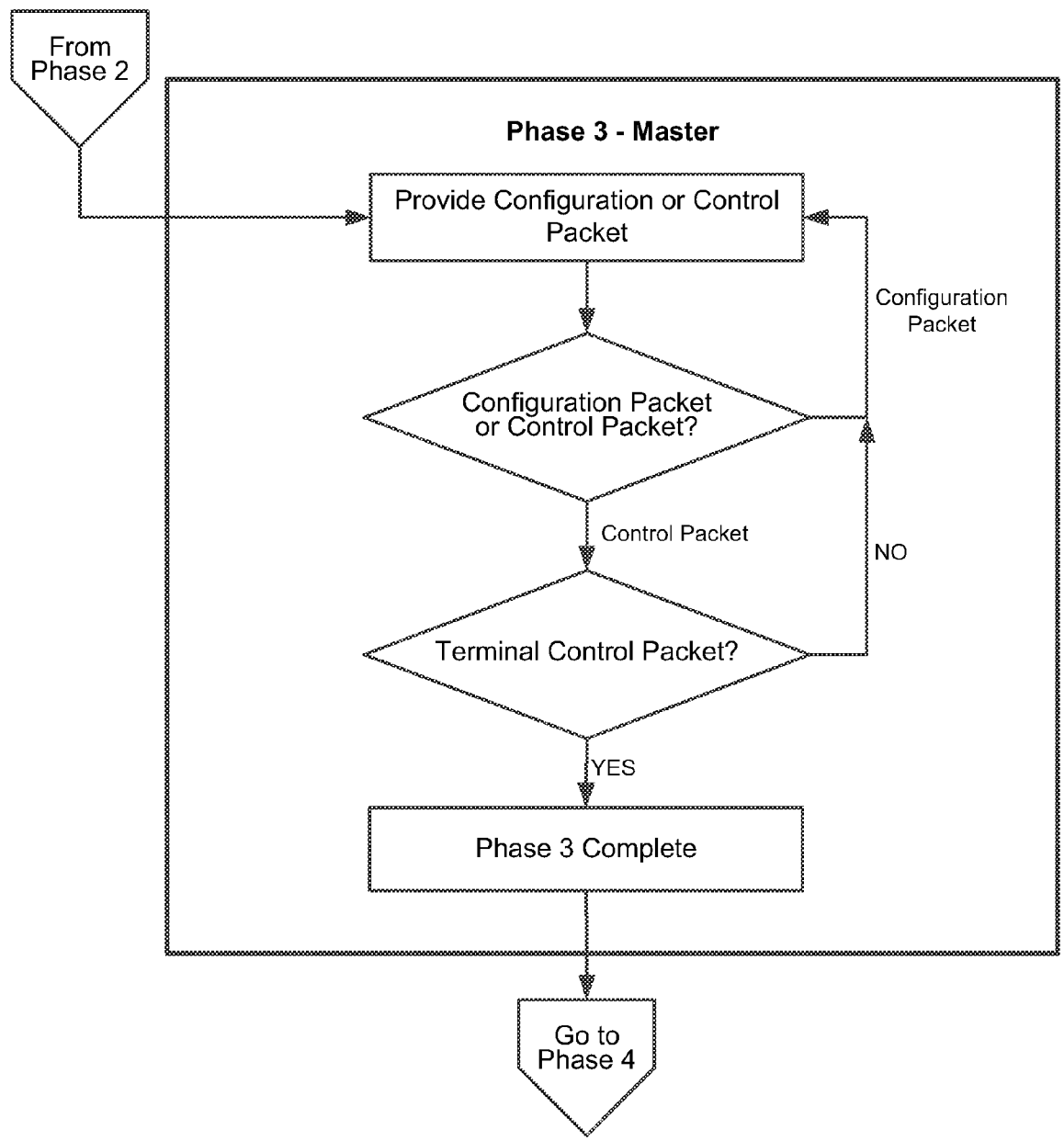
FIG. 6 shows another element of the method of FIG. 1 in greater detail.
Figure 7:
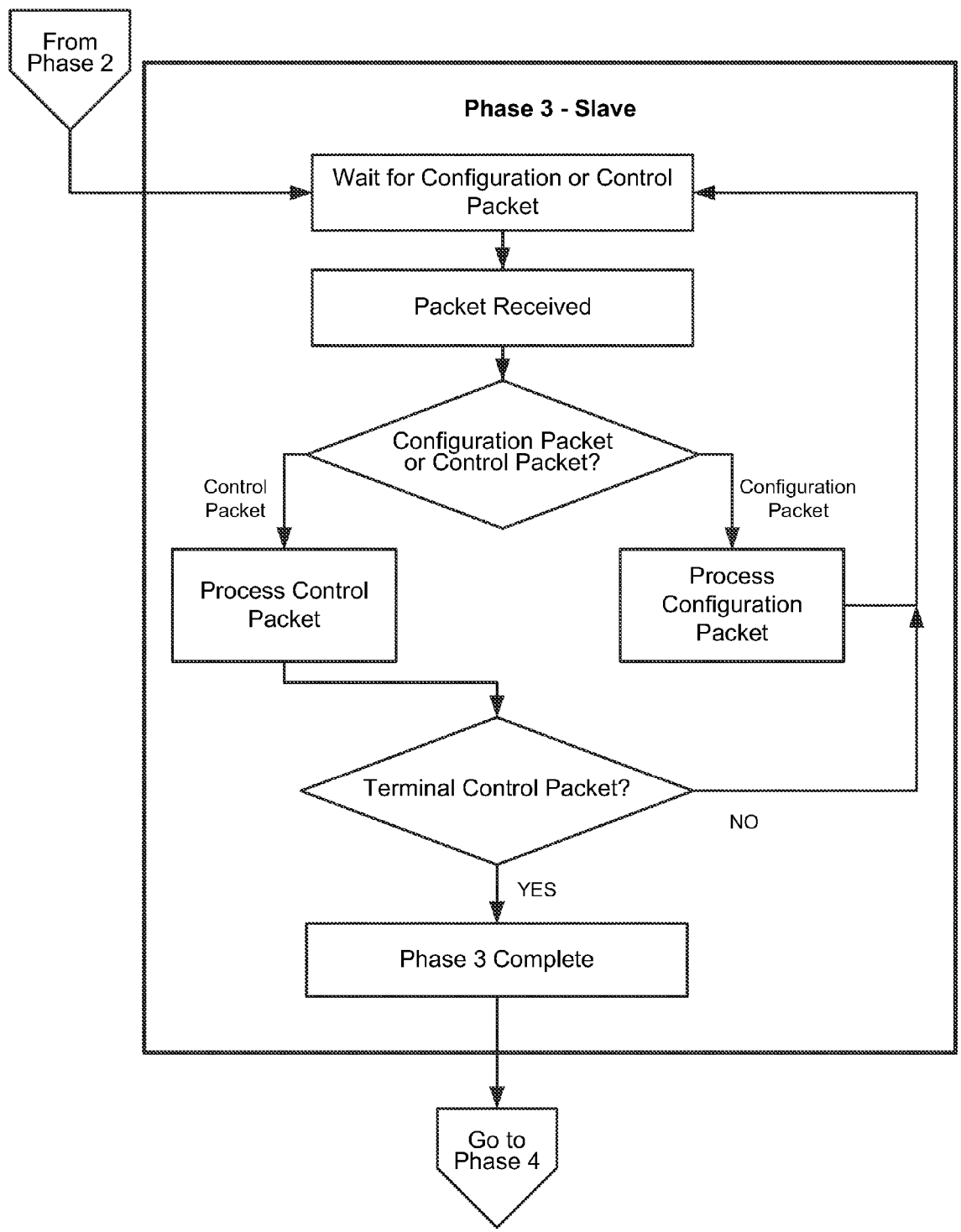
FIG. 7 shows another element of the method of FIG. 1 in greater detail.

FIG. 6 and FIG. 7 are flowcharts illustrating respective embodiments of phase 3 processing from a master perspective and a slave perspective, respectively. It will be appreciated that in the present embodiment, the precise nature of phase 3 is different for a master device than for a slave device. A master device generally transmits configuration data, whilst a slave device generally receives the configuration data. As mentioned above, in one embodiment, two types of data packets are used during phase 3: configuration packets and control packets. For control packets, by a terminal control packet is a particular type of control packet that is used to indicate that configuration has been completed. In one embodiment, a master device transmits a terminal control packet once all configuration packets for a particular configuration have been provided, and the process subsequently progresses to phase 4. A slave device is responsible on receipt of a terminal control packet for progressing to phase 4.

Figure 8:
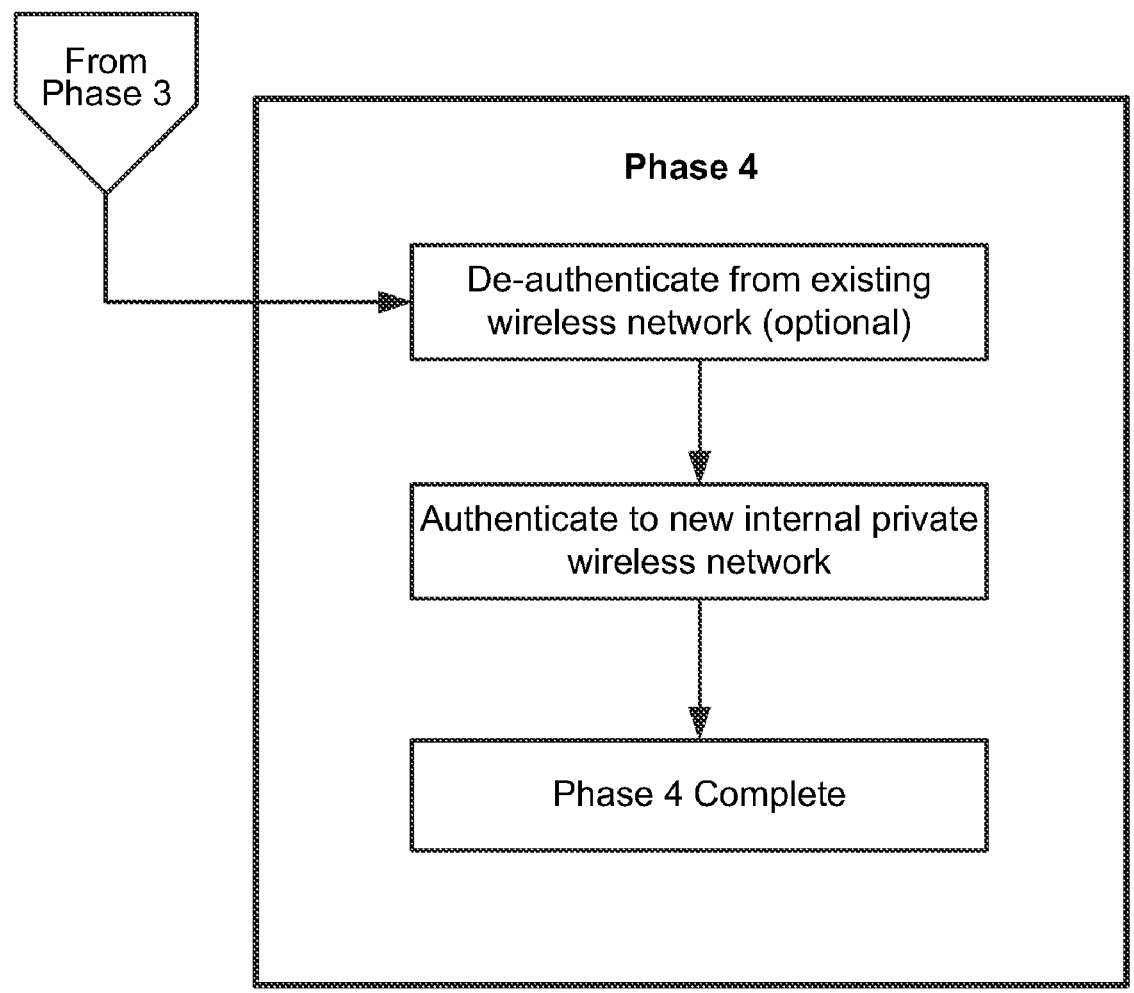
FIG. 8 shows another element of the method of FIG. 1 in greater detail.

FIG. 8 provides a general flowchart of one embodiment of phase 4. A purpose of phase 4 is for the device to cross over to the second wireless network that was identified or defined during phase 3. Typically crossing over includes de-authentication from the first wireless network. Often the devices, at a time specified in phase 3, de-authenticate from the first wireless network using 802.11 de-authentication frames. In some instances the trigger point for de-authentication is the receipt by the device of a control frame indicating when the transition to the new internal network will occur. Various approaches are used among embodiments.

Note that in some alternate embodiments, a master device does not de-authenticate from the first wireless network, and instead remains connected to enable discovery of subsequent devices or to maintain a link with one or more additional distributed network devices that are not complementary wireless devices. For example, consider a set of wireless loudspeaker subsystems used to play music stored on a networked personal computer. A specific example along such lines is discussed further below.

In the one embodiment, phase 4 uses an unconventional fast transfer approach rather than conventional 802.11 re-association. In one instance, the format of a fast transfer request form is as per the 802.11 standard re-association frame, with the addition of a single information element (IE) after the supported rates element. An example of such an information element is provided in FIG. 9. The rationale for such an approach is that various parameters such as network keys are established during phase 3, and there is little value in duplication of efforts.

In one embodiment, phase 4 includes a traditional IEEE 802.11 transfer—authentication followed by association—with the key as provisioned during phase 3 being used thereafter as the encryption key.

Figure 10:
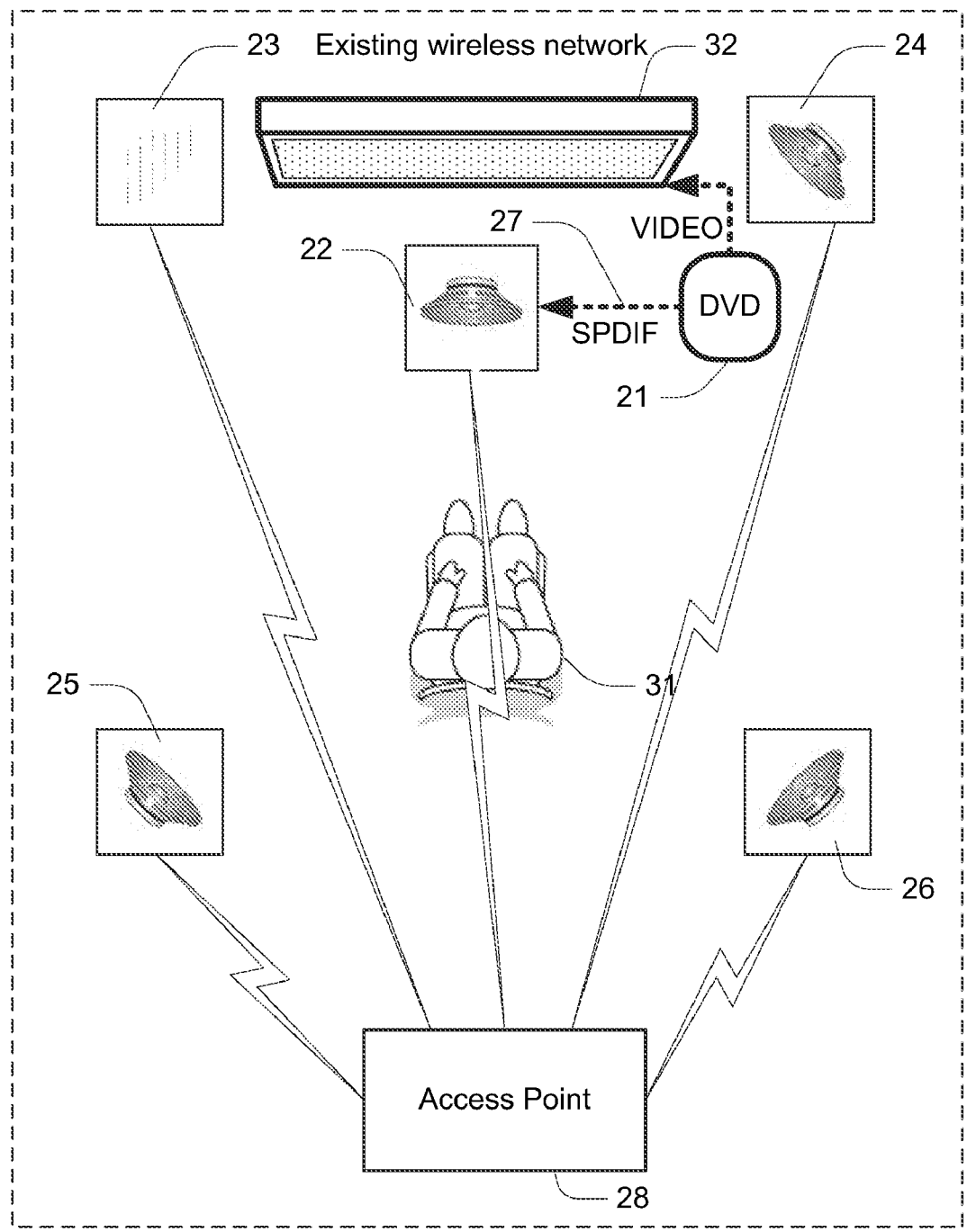
FIG. 10 is a schematic representation of a media system and devices according to embodiments of the invention, shown in an initial configuration.
Figure 11:
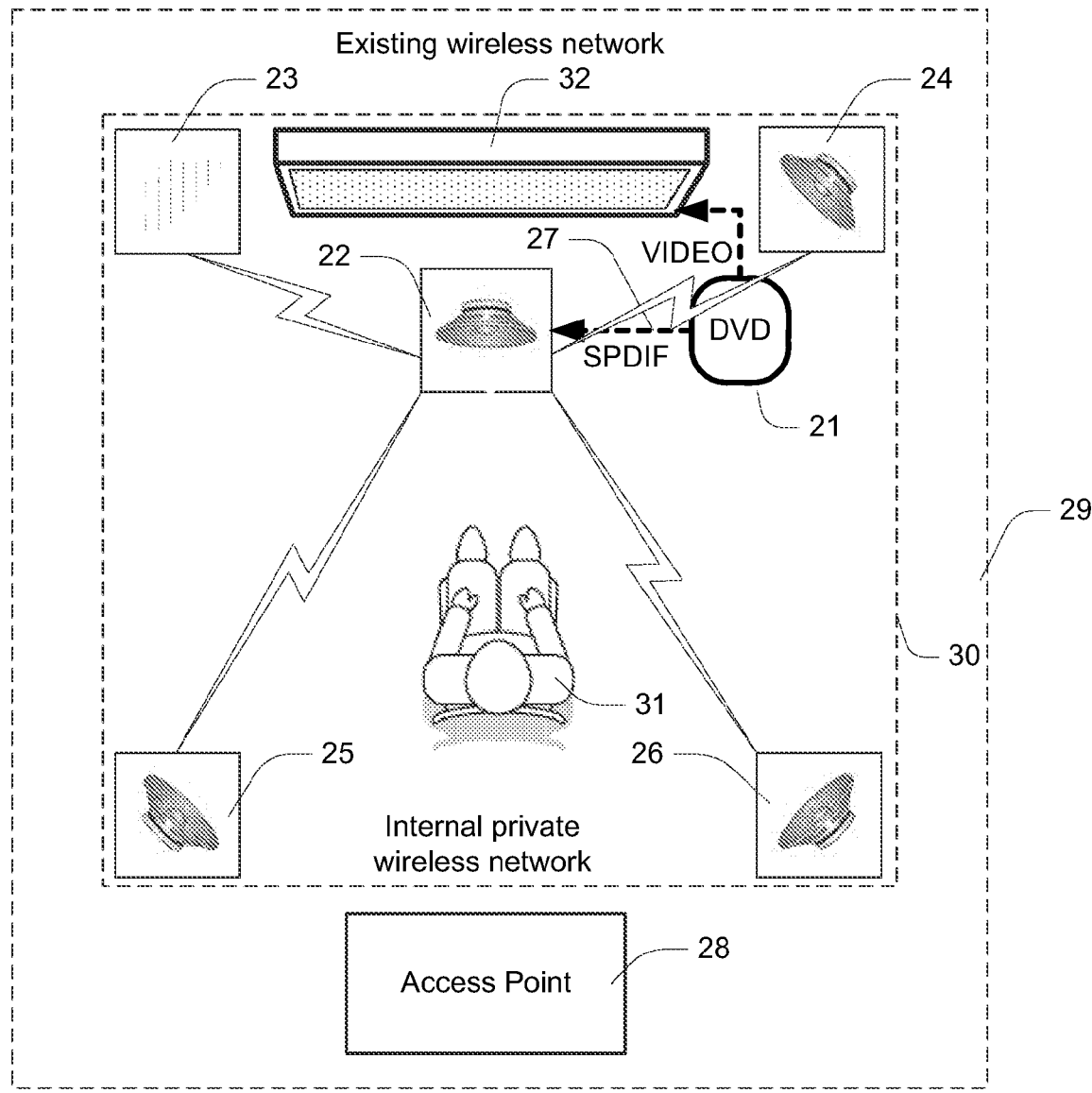
FIG. 11 shows the system of FIG. 10 in a final configuration.

FIGS. 10 and 11 each illustrate an example wireless media system 20. In one embodiment, system 20 includes a digital audio signal source such as a DVD player 21 and five wireless loudspeaker subsystems 22 to 26. These wireless loudspeaker subsystems respectively provide a center, front left, front right, rear left and rear right wireless loudspeaker subsystem. In one embodiment, each wireless loudspeaker subsystem includes a wireless network interface coupled to a processor configured to perform the four-phase method of FIG. 1. FIG. 10 shows an initial configuration, and FIG. 11 shows the final configuration.

In one embodiment, DVD player 21 includes a digital data output port, e.g., an output 27 for providing S/PDIF format data indicative of multi-channel digital audio. Output 27 is coupled to the input of center wireless loudspeaker subsystem 22. In one embodiment, the task of the center wireless loudspeaker subsystem 22 is to appropriately wirelessly distribute the multi channel digital audio to wireless loudspeaker subsystems 23 to 26 in a manner to allow real-time audio playback, and in a manner that maintains lip-sync, e.g., the delays within acceptable lip-sync thresholds.

An access point 28, e.g., a third party access point provides a first wireless network 29 in the vicinity of wireless loudspeaker subsystems 22 to 26. The wireless loudspeaker subsystems, once powered on, inherently associate to this first wireless network.

In this example system 20, center wireless loudspeaker subsystem 22 is the relative master device, and each of wireless loudspeaker subsystems 23 to 26 is a slave device. This master/slave relationship is established between the devices during the discovery portion of phase 1. Center wireless loudspeaker subsystem 22 then undergoes phases 2 to 4 separately and individually with each other wireless loudspeaker subsystem, and in doing so transfers communication with each of the wireless loudspeaker subsystems to be on a common internal private wireless network 30 having parameters stipulated by wireless loudspeaker subsystem 22. Wireless loudspeaker subsystem 22 determines appropriate parameters for the internal private wireless network 30 based on an inbuilt protocol and optionally an assessment of local network conditions and quality.

Figure 12:
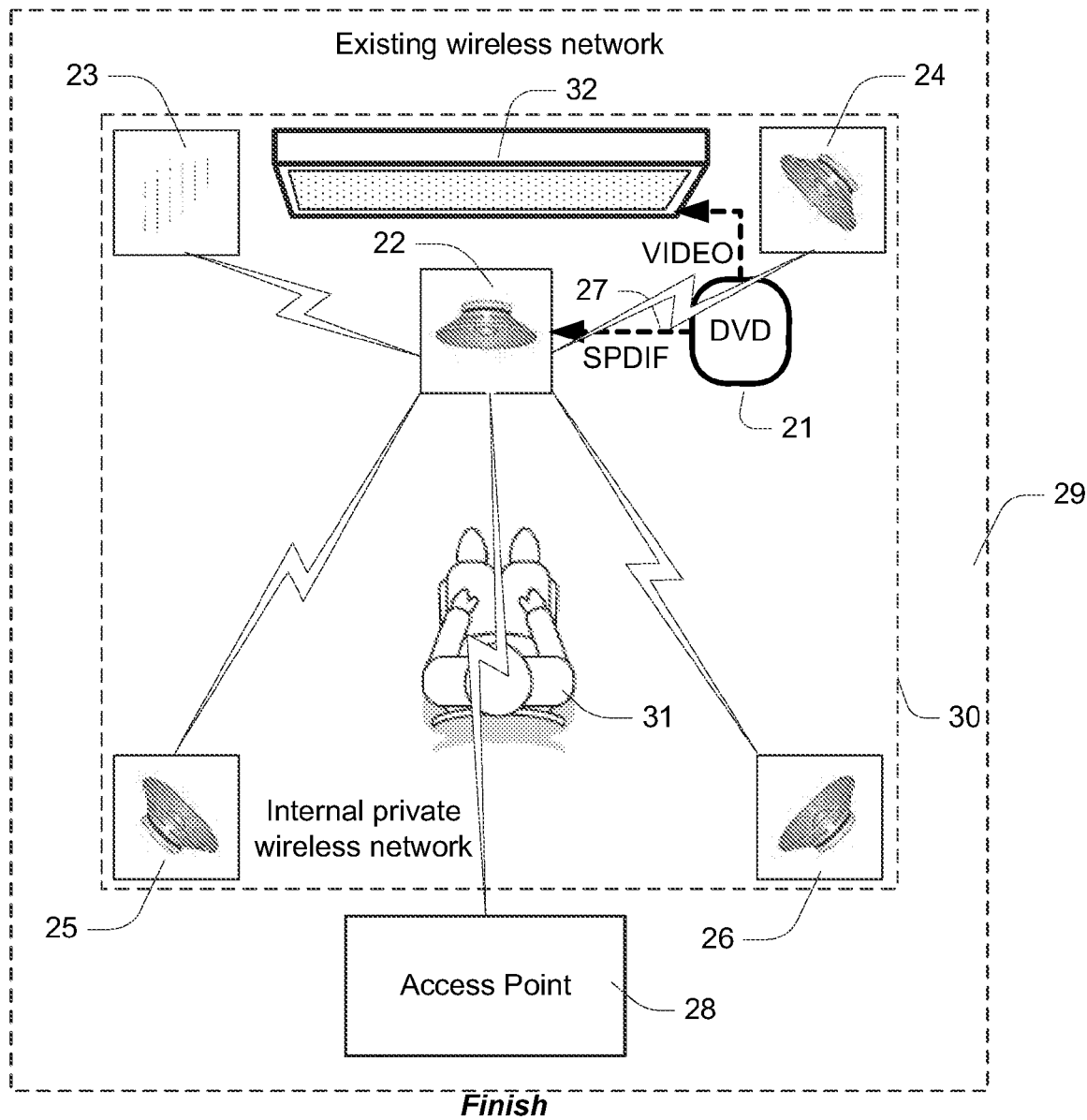
FIG. 12 is a variation on the final configuration of FIG. 11.

FIG. 11 shows an example state in which all of wireless loudspeaker subsystems 22 to 26 have de-authenticated from the wireless network 29. FIG. 12 illustrates an example where the center wireless loudspeaker subsystem remains associated to access point 28.

In the configuration of FIG. 11, DVD player 21 is used to play a DVD containing audio and possibly video information intended to be provided to a listener/human subject 31 within an acceptable lip-sync delay between the audio and video. Wireless network 29 is configured to allow audio data provided by DVD player 21 to be provided via the respective audio outputs of wireless loudspeaker subsystems 22 to 26 substantially at the same time as corresponding video data is displayed on an LCD display 32.

It will be appreciated that the mention of an LCD display is not to be regarded as limiting, and in other instances alternate display means are used such as projectors, televisions in a broader sense, personal or laptop computer screens, and so on.

It may be that there is no access point such as access point 28 present. One embodiment of wireless loudspeaker subsystem 22 includes hardware and software to enable the wireless loudspeaker subsystem 22 to act as an access point to which other wireless loudspeaker subsystems associate. This is useful in an environment where there is no existing access point. In one example, once the wireless loudspeaker subsystems are all transferred to the second wireless network, the access point of wireless loudspeaker subsystem 22 is disabled. In such a case, beacon frames are broadcast that are recognizable by a further complementary wireless loudspeaker subsystem that receives such a beacon provided through the second wireless network. This beacon informs the further wireless loudspeaker subsystem of the existence of the second internal private wireless network, and prompts that wireless loudspeaker subsystem to take steps to join the internal private wireless network.

In some embodiments, phase 1 includes an initial scanning phase to handle situations where several like wireless loudspeaker subsystems are powered on in the absence of a third party access point. In such a case, each device scans for a predetermined period of time, and if no beacon frames are received, establishes its wireless node as an access point. In a similar manner to the master/slave determination technique discussed above, MAC addresses are often used to assist this process. Specifically, in one embodiment, each wireless loudspeaker subsystem scans for a period of time related to the final byte in its MAC address—typically between about five to ten seconds multiplied by the value of that final byte. If no access point is found within that time, the wireless loudspeaker subsystem itself initiates its own access point. It will be appreciated that by such an approach only one of the wireless loudspeaker subsystems need initiate an access point, and the remaining wireless loudspeaker subsystems will associate to that access point. Further, the wireless loudspeaker subsystem providing the access point is the master device.

The initial scanning phase described above should not be regarded as limiting. In other embodiments scanning is carried out by sending out one or more broadcast probe requests or other specific probe requests.

Figure 13:
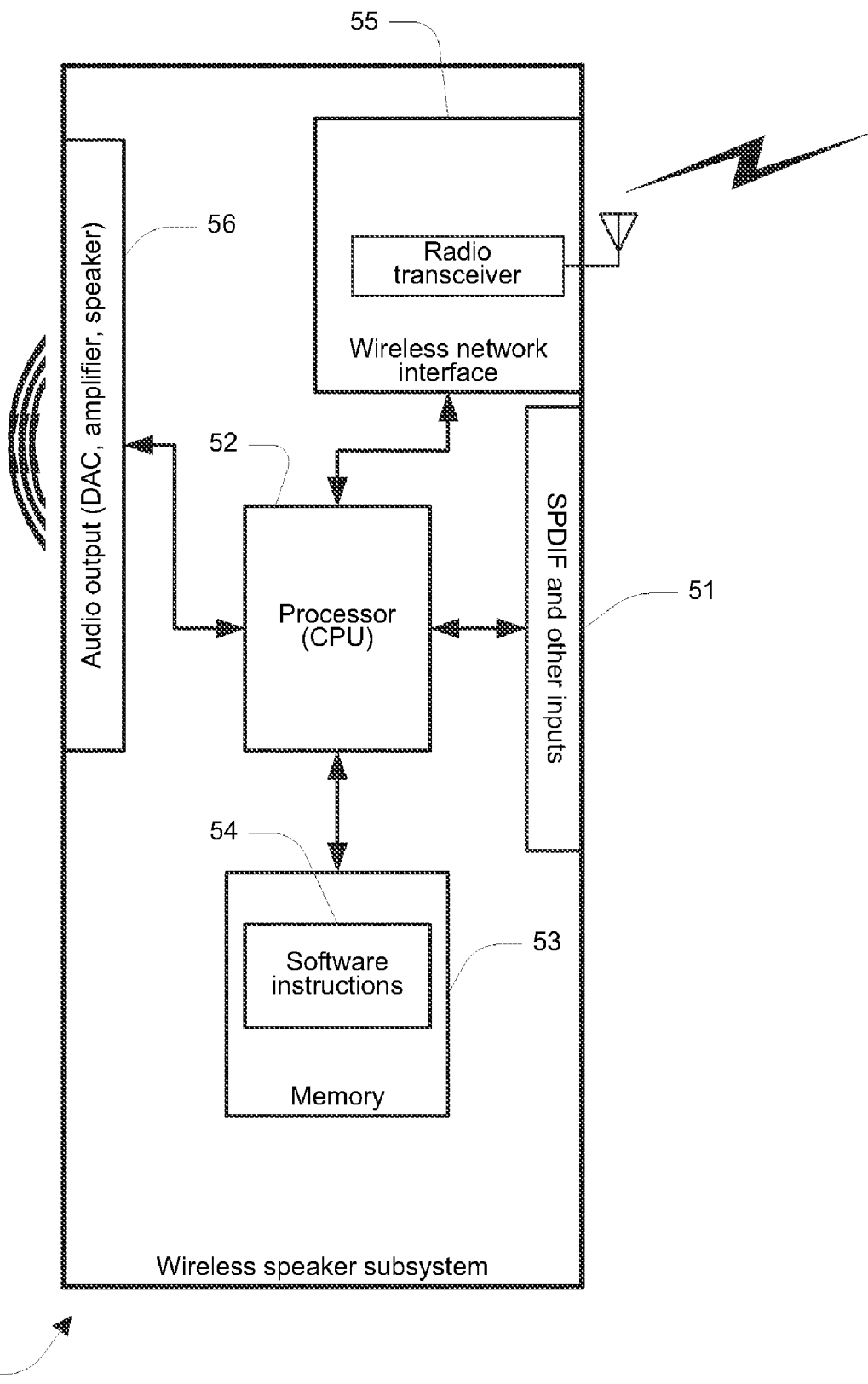
FIG. 13 schematically illustrates an example wireless loudspeaker subsystem.

FIG. 13 schematically illustrates an example wireless loudspeaker subsystem 22. This wireless loudspeaker subsystem includes an input array 51 for receiving audio signals. Array 51 includes an S/PDIF input, along with one or more various other standard and/or proprietary digital audio inputs. In some instances array 51 includes one or more analog audio inputs, in which case wireless loudspeaker subsystem 22 includes an analog to digital converter for converting analog audio signals into digital form. Once received, and where necessary digitized, the audio signals are processed by a programmable processor (CPU) 52, which operates in conjunction with memory 53. Memory 53 includes software instructions 54, which, among other functions, when executed in the processor 52, cause the wireless loudspeaker subsystem 22 to perform the above-described four-phase method. It is noted that not all instructions required for causing this method to be implemented need be in memory 53 at the same time. In such a situation, wireless loudspeaker subsystem 22 includes another medium to carry, e.g., store all the instructions. Thus for such embodiment, memory 53 as shown herein includes any such other carrier medium.

CPU 52 is further responsible for administering playback of a received audio signal. In a broad sense, this involves two distinct tasks. Firstly, using a wireless network interface 55 coupled to the processor 52, providing instructions to other wireless loudspeaker subsystems on the defined internal private wireless network to play respective components of the audio signal. Secondly, using an audio output 56 that includes a digital to analog converter (DAC), amplifier, and one or more loudspeakers, playing back the intended center wireless loudspeaker subsystem component of the audio signal. The wireless loudspeaker subsystem is rearranged to correctly render the output, and to so do in a manner synchronized with playback with other wireless loudspeaker subsystems. Details of these aspects are not included herein in order not to obscure the inventive aspects of the present invention.

Figure 14:
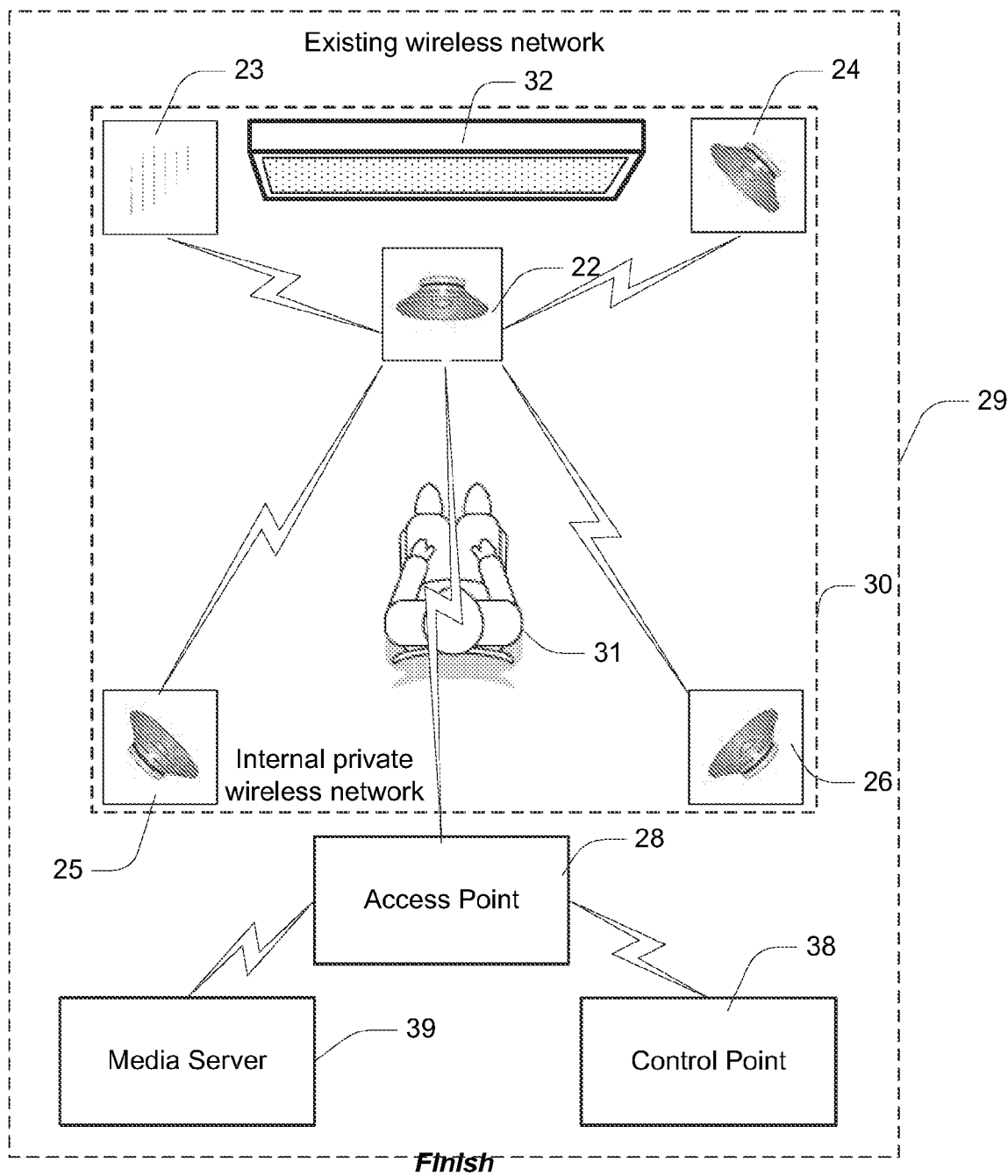
FIG. 14 is a further variation on the final configuration of FIG. 1.

FIG. 14 illustrates an example of a system that is similar to the one of FIGS. 10 to 12, but wherein, instead of a DVD player providing a source of digital audio, there is provided a distributed and networked UPnP control point 38 and a wireless media server 39. In this example arrangement, assume control point 38 and server 39 are not coupled to complementary wireless devices. In the process of connecting, the wireless loudspeaker subsystems 22 to 26, control point 38 and server 39 associate to wireless network 29.

Following the four-phase process, wireless loudspeaker subsystems 22 to 26 authenticate to network 30. Control point 38 and server 39 remain associated to wireless network 29. In this example, during phase 4 the master wireless loudspeaker subsystem 22 remains associated to wireless network 29. That is, wireless loudspeaker subsystem 22 does not de-authenticate from access point 28 during phase 4. The rationale for this approach is to allow the wireless loudspeaker subsystems to play media maintained on server 39 under instruction of control point 38. From an implementation perspective, wireless loudspeaker subsystem 22 may include two radio transceivers, and may communicate over wireless network 29 using a different radio to that used in relation to network 30. In another implementation, wireless loudspeaker subsystem 22 may use a single radio interface, maintaining communication to networks 29 and 30 using the same radio.

Figure 15:
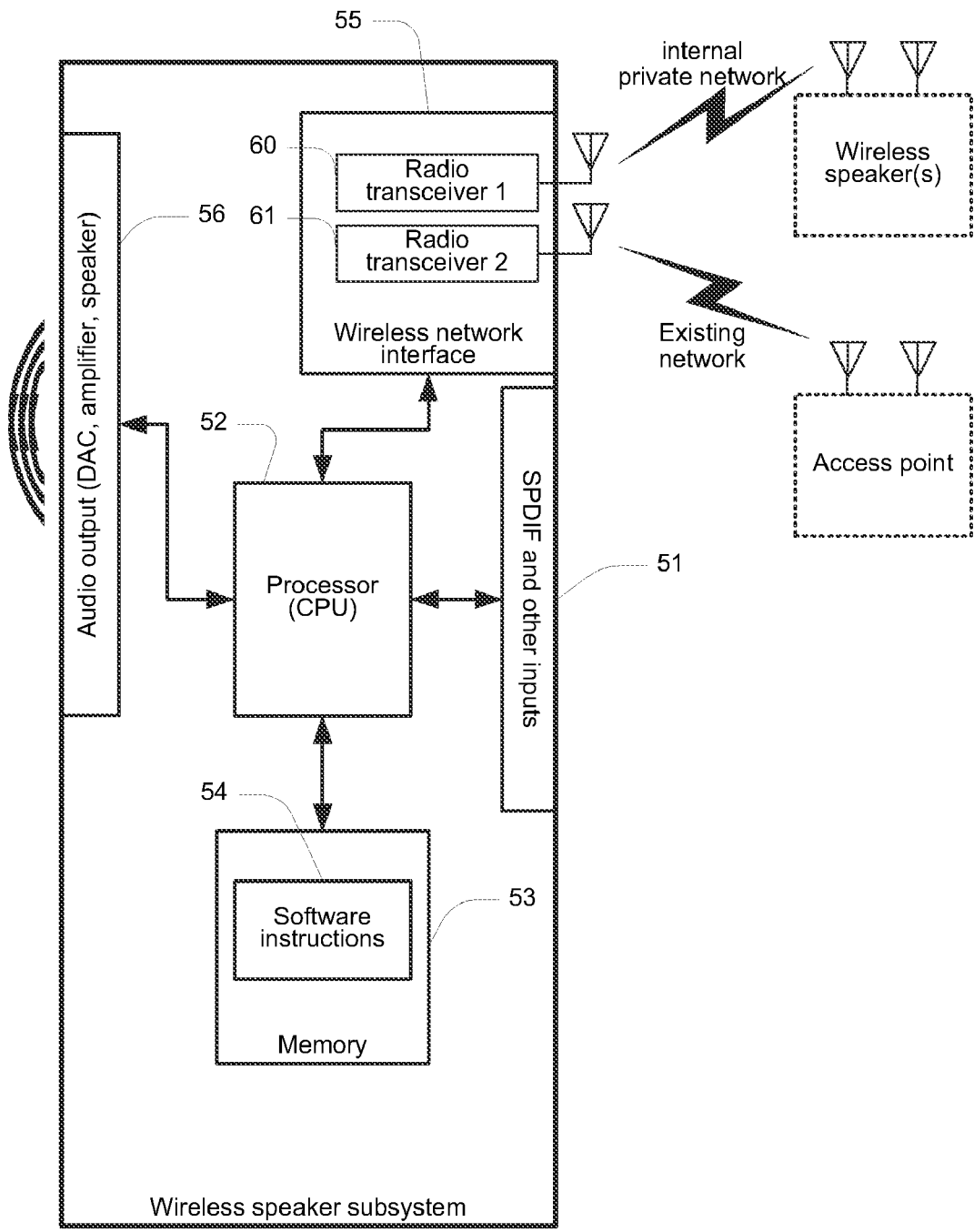
FIG. 15 schematically illustrates a further example wireless loudspeaker subsystem.

FIG. 15 schematically shows an example wireless loudspeaker subsystem 22 for a system along the lines of FIG. 14. This wireless loudspeaker subsystem 22 is similar to the wireless loudspeaker subsystem of FIG. 15, hence uses the same reference numeral for itself and many of its components. However, in this embodiment, the wireless network interface 55 includes a first radio transceiver 60 and a second radio transceiver 61. Radio transceiver 60 is used for wireless communication via the existing wireless network 29 to allow communication with control point 38 and server 39 using access point 28. Radio 61 is used for communication with wireless loudspeaker subsystems 23 to 26 via the internal private wireless network 30.

While the above embodiments describe audio signals originating from DVD players and media servers, in other embodiments audio signals originate from a variety of other sources. Possible other sources include, but are not limited to: CD players, laptop or desktop computers, personal media players, cradles for portable media playback devices, cellular telephones, amplifiers and other consumer electronic devices that provide an audio output functionality.

Although the above disclosure has been generally limited to application in wireless environments, it extends to other network types such as optical networks and power line networks used in homes. Modifying the embodiments described herein to accommodate such other networks would be straightforward to those skilled in the art from the description herein. Hence the term wireless network as used herein includes such other networks.

Embodiments of the invention take the form not only of the general four-phase method and variations thereon, but also in software and hardware used to implement such methods. For example, wireless media devices that include a first wireless network interface for connecting to a first wireless network; a second wireless network interface for establishing a secure communications tunnel with a complementary wireless device on the first wireless network; a third wireless network interface for sharing with the complementary wireless device over the secure communications tunnel data indicative of a set of parameters for a second wireless network; and a fourth wireless network interface for connecting to the second wireless network. In some embodiments, these interfaces are provided by a common 802.11 wireless network interface operating under instruction of a microprocessor.

It will be appreciated that the above disclosure provides various techniques for wireless network configuration that allow a set of wireless media devices to self-configure an internal private wireless network having characteristics well suited to the purpose of time-sensitive data transfer and playback, e.g., media data transfer and playback.

Aspects of the invention include managing one or more aspects of access point functionality, e.g., to reduce latency and/or improve other performance features important for time-sensitive data playback. The managing uses one or more of the following mechanisms:

Implementing wireless quality of service (QoS) such as that specified in the IEEE 802.11 standard or Wi-Fi Multimedia (WMM) based on a subset of IEEE 802.11 standard. Implementing IEEE 802.11 standard/WMM QoS includes tuning the network parameters for the particular audio playback application.

Managing the device's network behavior by control of the access point configuration and/or radio configuration. In this manner, different embodiments can carry out one or more functions at the system level such as dynamically changing channel and/or adjusting individual station transmit rates.

Creating a "private" internal network using a separate channel or a separate frequency band, such that re-use of existing possibly congested channels is avoided.

Controlling device associations, for example so that only devices that will directly participate in the internal network be permitted into the network.

Ignoring power save mode during playback. Power save mode is a major cause of network congestion, especially when multicast and broadcast packets are involved.

Using otherwise standard IEEE 802.11 standard beacon and/or probe response frames to perform multimedia specific synchronization and timing functions. In one embodiment, only the absolute minimum amount of information needed for devices to operate are included, together with at least one new multimedia playback specific information element (IE) for multimedia stream control. See for example, the above-referenced incorporated by reference "Synchronization Invention" application. All other information that otherwise would be in the beacon frame is removed.

A particularly important result is that wireless media devices are able to self configure themselves to form a controllable internal private wireless network substantially automatically, often leveraging an existing wireless network to assist in such a goal. In effect, devices are able to use a network that is not necessarily suitable for time-sensitive data, e.g., media data applications to self configure a more appropriate network.

By media is meant time-sensitive data for streaming and playback, e.g., audio data for playback via a plurality of loudspeaker subsystems, or audio-visual data for playback. Each loudspeaker subsystem or more than one loudspeaker subsystems can be for playback of a particular audio channel in a multi-channel playback system, e.g., stereo or surround sound. Also included is the case of a plurality of loudspeaker subsystems playing back the same audio data but that need to be synchronized, e.g., a set of loudspeakers in a spatially large environment wherein it is important that the sounds from the loudspeakers do not interfere with each other. Also included is the case of one or more audio channels that need to be synchronized with video playback.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While embodiments for operation in a wireless network conforming to the IEEE 802.11 standard has been described, the invention may be embodied with transceivers and network devices conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and media mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium, and also through power-line and other similar networks. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computer" or a "computing machine" or a "computing platform" may include one or more processors.

The methodologies described herein are, in one embodiment, performable by a machine which includes a one or more processors that execute computer readable instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that are part of a wireless loudspeaker subsystem that includes a wireless interface. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable instructions that when executed by one or more processors of a processing system, cause the processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program instructions embodied in the medium.

The software may further be transmitted or received over a network via the network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Description of Example Embodiments section are hereby expressly incorporated into this description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a wireless media device for configuring and connecting to a media wireless network, the method including the steps of
   (i) connecting to an existing wireless network that is discoverable;
   (ii) establishing a secure communications tunnel with a complementary wireless device on the existing wireless network;
   (iii) sharing with the complementary wireless device over the secure communications tunnel data indicative of a set of parameters for the media wireless network, wherein the media wireless network is an internal private wireless network, wherein the set of parameters include parameters selected to tune the media wireless network for the purpose of wireless media streaming, wherein the media wireless network is physically separate or virtually separate from the existing wireless network; and
   (iv) connecting to the media wireless network and communicating with the wireless media device on the media wireless network for the purpose of wireless media streaming, wherein the media wireless network is not discoverable by at least one of the wireless media device and the complementary media device prior to (iii).

2. A method according to claim 1, wherein in response to completion of the sharing, the wireless media device disconnects from the existing wireless network.

3. A method according to claim 2, wherein disconnecting from the existing wireless network includes de-authenticating from the existing wireless network.

4. A method according to claim 1, wherein the step of establishing the secure identification tunnel uses a Diffie Hellman key exchange protocol.

5. A method according to claim 1, wherein the step of establishing the secure identification tunnel allows mutual authentication of the wireless media device and the complementary wireless device.

6. A method according to claim 5, wherein the wireless media device and complementary wireless device maintain respective digital certificates for facilitating the mutual authentication.

7. A method according to claim 1, wherein establishment of the secure identification tunnel provides a virtual network for interfacing the wireless media device with the complementary wireless device such that a packet sent at one side of the tunnel is securely delivered at the other end of the tunnel.

8. A method according to claim 1, further including a master/slave determination step for allowing the wireless media device to determine whether it is a relative slave device or relative master device by comparison to the complementary wireless device.

9. A method according to claim 8, wherein for the step of sharing data indicative of the set of parameters, the relative master device communicates to the relative slave device one or more configuration data packets indicative of the set of parameters.

10. A method according to claim 8, wherein the wireless media device and complementary wireless device have respective hierarchical identifiers for facilitating the master/slave determination step.

11. A method according to claim 10, wherein the hierarchical identifiers are embedded in respective unique device identifiers.

12. A method according to claim 11, wherein the unique device identifiers are MAC addresses.

13. A method according to claim 1, wherein upon connection to the existing wireless network, the wireless media device undergoes a discovery procedure for allowing the wireless media device and the complementary wireless device to discover each other.

14. A method according to claim 1, wherein the existing wireless network is provided by a third party access point.

15. A method according to claim 1, wherein the existing wireless network is provided by the wireless media device.

16. A method according to claim 1, wherein existing wireless network is provided by the complementary wireless device.

17. A method according to claim 1, wherein the step of connecting to the existing wireless network includes the sub steps of:
   searching for the existing wireless network; and
   in the case that the searching finds the existing wireless network, associating to the found network, and in the case that the searching does not find any available wireless network, forming an access point for providing the existing wireless network and associating to that network.

18. A method according to claim 17, wherein the wireless media device searches for the existing wireless network for a predetermined period of time.

19. A method according to claim 18, wherein the predetermined period is based on a component of a unique identifier of the wireless media device.

20. A method according to claim 19, wherein the unique identifier is the MAC address of the wireless media device.

21. A method according to claim 1, wherein the complementary wireless device is enabled to perform substantially the same method as the wireless media device.

22. A carrier medium carrying computer readable instructions that when executed by one or more processors of a processing system in a wireless media device, cause the wireless media device to implement a method for configuring and connecting to a media wireless network, the method including the steps of:
   (i) connecting to an existing wireless network that is discoverable;
   (ii) establishing a secure communications tunnel with a complementary wireless device on the existing wireless network;
   (iii) sharing with the complementary wireless device over the secure communications tunnel data indicative of a set of parameters for the media wireless network, wherein the media wireless network is an internal private wireless network, wherein the set of parameters include parameters selected to tune the media wireless network for the purpose of wireless media streaming, wherein the media wireless network is physically separate or virtually separate from the existing wireless network; and (iv) connecting to the media wireless network and communicating with the wireless media device on the media wireless network for the purpose of wireless media streaming, wherein the media wireless network was not discoverable by at least one of the wireless media device and the complementary media device prior to (iii).

23. A wireless media device including:

a first wireless network interface for connecting to an existing wireless network;

a second wireless network interface for establishing a secure communications tunnel with a complementary wireless device on the existing wireless network;

a third wireless interface for sharing with the complementary wireless device over the secure communications tunnel data indicative of a set of parameters for a second wireless network, wherein the second wireless network is an internal private wireless network, wherein the set of parameters include parameters selected to tune the second wireless network for the purpose of wireless media streaming, wherein the second wireless network is physically separate or virtually separate from the existing wireless network; and a fourth wireless interface for connecting to the second wireless network and communicating with the wireless media device on the second wireless network for the purpose of wireless media streaming, wherein the second wireless network was not discoverable by at least one of the wireless media device and the complementary media device prior to the sharing of the data indicative of the set of parameters by the third wireless interface.

24. A wireless media device according to claim 23 wherein the first, second, third and fourth wireless interfaces are collectively defined by a wireless network interface coupled to a processor and memory unit.

25. A carrier medium carrying computer readable instructions that when executed by one or more processors of a processing system in a wireless media device, cause the wireless media device to implement a method for configuring and connecting to a media wireless network, the method including the steps of:

connecting to an existing wireless network;

establishing a secure communications tunnel with a complementary wireless device on the existing wireless network;

sharing with the complementary wireless device over the secure communications tunnel data indicative of a set of parameters for a second wireless network, wherein the second wireless network is an internal private wireless network, wherein the set of parameters include parameters selected to tune the second wireless network for the purpose of wireless media streaming, wherein the second wireless network is physically separate or virtually separate from the existing wireless network; and connecting to the second wireless network and communicating with the wireless media device on the second wireless network for the purpose of wireless media streaming, wherein the second wireless network was not discoverable by at least one of the wireless media device and the complementary media device prior to the sharing of the data indicative of the set of parameters.

26. A method for establishing a securely configurable network for a plurality of wireless media devices, the method including the steps of:

allowing the wireless media devices to connect to an existing wireless network;

establishing one or more secure communication tunnels between the wireless media devices;

passing over the one or more secure communication tunnels data indicative of a set of parameters for a second wireless network, wherein the second wireless network is an internal private wireless network, wherein the set of parameters include parameters selected to tune the second wireless network for the purpose of wireless media streaming, wherein the second wireless network is physically separate or virtually separate from the existing wireless network; and allowing the devices to connect to the second wireless network and communicate on the second wireless network for the purpose of wireless media streaming, wherein the second wireless network was not discoverable by at least one of the wireless media devices prior to the passing of the data indicative of the set of parameters.

27. A method in a wireless audio device for configuring and connecting to a wireless audio network, the method including the steps of:

connecting to an existing wireless network;

establishing a secure communications tunnel with a complementary wireless audio device on the first existing wireless network;

sharing with the complementary wireless device over the secure communications tunnel data indicative of a set of parameters for a media wireless network, wherein the media wireless network is an internal private wireless network, wherein the set of parameters include parameters selected to tune the media wireless network for the purpose of wireless media streaming, wherein the media wireless network is physically separate or virtually separate from the existing wireless network; and connecting to the media wireless network and communicating with the wireless media device on the second wireless network for the purpose of wireless media streaming, wherein the second wireless network was not discoverable by at least one of the wireless media device and the complementary media device prior to the sharing of the data indicative of the set of parameters.

* * * * *